(12) United States Patent
Nishi et al.

(10) Patent No.: US 7,104,244 B2
(45) Date of Patent: Sep. 12, 2006

(54) CONTROL SYSTEM FOR VARIABLE-CYLINDER INTERNAL COMBUSTION ENGINE

(75) Inventors: Tomohiro Nishi, Saitama-ken (JP); Masanobu Asakawa, Saitama-ken (JP); Toshitaka Hachiro, Saitama-ken (JP); Manabu Niki, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/280,462

(22) Filed: Nov. 17, 2005

(65) Prior Publication Data
US 2006/0107919 A1 May 25, 2006

(30) Foreign Application Priority Data
Nov. 22, 2004 (JP) .............................. 2004-337126

(51) Int. Cl.
*F02D 13/06* (2006.01)
(52) U.S. Cl. ................................................. 123/198 F
(58) Field of Classification Search ............. 123/198 F
See application file for complete search history.

(56) References Cited

U.S. PATENT DOCUMENTS

| | | | | |
|---|---|---|---|---|
| 4,227,505 A | * | 10/1980 | Larson et al. ............. | 123/198 F |
| 5,431,139 A | * | 7/1995 | Grutter et al. ............ | 123/198 F |
| 5,975,052 A | * | 11/1999 | Moyer .................... | 123/406.23 |
| 6,662,785 B1 | * | 12/2003 | Sloane et al. ............... | 123/481 |
| 6,718,937 B1 | * | 4/2004 | Kim ........................ | 123/198 F |
| 6,739,314 B1 | * | 5/2004 | Bauerle et al. ............. | 123/396 |
| 6,748,916 B1 | * | 6/2004 | Schaefer-Siebert ...... | 123/198 F |
| 6,758,187 B1 | * | 7/2004 | Waters .................... | 123/198 F |

FOREIGN PATENT DOCUMENTS

JP 2004332618 A * 11/2004

* cited by examiner

*Primary Examiner*—Marguerite McMahon
(74) *Attorney, Agent, or Firm*—Westerman, Hattori, Daniels & Adrian, LLP.

(57) ABSTRACT

A control system for a variable-cylinder internal combustion engine, which is capable of attaining excellent fuel economy by executing a partial-cylinder operation mode as long as possible, while suppressing vibration and noise during the partial-cylinder operation mode. A control system switches the operation mode of a variable-cylinder internal combustion engine between an all-cylinder operation mode in which all of a plurality of cylinders (#1 to #3, and #4 to #6) are put in operation, and a partial-cylinder operation mode in which some (#1 to #3) of the plurality of cylinders are deactivated. During the partial-cylinder operation mode, the control system 1 calculates a degree-of-continuation parameter SDTQCSNH indicative of a degree of continuation of a state where detected load TQECMDF on the engine is within a predetermined range of load between a first reference value TQCSNH and a second reference value TQCSEH smaller than the first reference value (steps 10 to 13), and determines whether or not the operation mode should be switched to the all-cylinder operation mode, based on the degree-of-continuation parameter SDTQCSNH (step 14).

5 Claims, 7 Drawing Sheets

CONTROL SYSTEM FOR VARIABLE-CYLINDER INTERNAL COMBUSTION ENGINE

BACKGROUND OF THE INVENTION

1. Field of the Invention

The present invention relates to a control system for a variable-cylinder internal combustion engine which is operated by switching between all-cylinder operation for operating all of a plurality of cylinders and partial-cylinder operation for deactivating operation of some of the plurality of cylinders.

2. Description of the Related Art

Conventionally, a control system of this kind has been proposed in Japanese Patent Application No. 2003-129264 by the present assignee. An internal combustion engine to which is applied the control system is a variable-cylinder internal combustion engine installed on a vehicle, which the control system puts in partial-cylinder operation so as to improve fuel economy, etc. when the opening of an accelerator pedal (stepped-on amount thereof) is smaller than a predetermined reference value, and otherwise, in all-cylinder operation.

As described above, when load on the engine represented by the opening of the accelerator pedal becomes larger than a predetermined reference value, the conventional control system switches the operation of the engine from the partial-cylinder operation to the all-cylinder operation. Therefore, for example, when the reference value is set to a value equivalent to an upper limit of load (hereinafter referred to as "the upper limit load") corresponding to maximum torque which can be outputted in the partial-cylinder operation, the partial-cylinder operation is performed as long as possible to thereby attain excellent fuel economy. Further, during the partial-cylinder operation, torque variation is more liable to occur than during the all-cylinder operation, since the number of operated cylinders is smaller. Particularly when the load on the engine comes closer to the upper limit load, torque variation increase to increase the vibration and noise of the engine. Thus, when the reference value is set to the upper limit load, very large vibration and noise can be caused.

To eliminate the above inconveniences, it may be considered that the reference value is set to such a smaller value as can suppress torque variation. In this case, however, a region for executing the partial-cylinder operation is limited to shorten time periods over which the partial-cylinder operation execution is executed, which results in degraded fuel economy.

SUMMARY OF THE INVENTION

The present invention has been made to provide a solution to the above-described problems, and an object thereof is to provide a control system for a variable-cylinder internal combustion engine, which is capable of attaining excellent fuel economy by executing a partial-cylinder operation mode as long as possible, while suppressing vibration and noise during the partial-cylinder operation mode.

To attain the above object, the present invention provides a control system for a variable-cylinder internal combustion engine which is operated by switching an operation mode between an all-cylinder operation mode in which all of a plurality of cylinders are put in operation and a partial-cylinder operation mode in which some of the plurality of cylinders are deactivated, comprising load-detecting means for detecting load on the engine, first switching determination means for determining that the operation mode should be switched to the all-cylinder operation mode, when the detected load on the engine is larger than a first reference value, during the partial-cylinder operation mode, degree-of-continuation parameter-calculating means for calculating a degree-of-continuation parameter indicative of a degree of continuation of a state where the load on the engine is within a predetermined range of load between the first reference value and a second reference value smaller than the first reference value, during the partial-cylinder operation mode, second switching determination means for determining based on the calculated degree-of-continuation parameter whether or not the operation mode should be switched to the all-cylinder operation mode, and switching execution means for executing switching from the partial-cylinder operation mode to the all-cylinder operation mode based on results of determinations by the first switching determination means and the second switching determination means.

With the configuration of this control system, during the partial-cylinder operation mode, when detected load on the engine becomes larger than the predetermined first reference value, the first switching determination means determines that the operation mode should be switched to the all-cylinder operation mode. Further, the switching execution means executes the switching to the all-cylinder operation mode based on the result of the determination. Therefore, for example, by setting the first reference value to an upper limit of load corresponding to maximum torque which can be outputted in the partial-cylinder operation mode (hereinafter referred to as "the upper limit load"), the operation mode can be switched to the all-cylinder operation mode when the load on the engine becomes larger than the upper limit load, thereby making it possible to output torque corresponding to the load.

Further, during the partial-cylinder operation mode, when the load on the engine is within the predetermined range of load between the first reference value and the second reference value smaller than the first reference value, the degree-of-continuation parameter-calculating means calculates the degree-of-continuation parameter indicative of the degree of continuation of the state. The second switching determination means determines based on the calculated degree-of-continuation parameter whether or not the operation mode should be switched to the all-cylinder operation mode. Further, the switching execution means executes switching to the all-cylinder operation mode based on the result of the determination. As described above, the switching to the all-cylinder operation mode is performed not simultaneously when the load on the engine exceeds the second reference value, but while confirming the degree of the continuation of the state where the load on the engine is within the above range of load, so that it is possible to lengthen the time period over which the partial-cylinder operation mode is executed. Further, during the partial-cylinder operation mode, torque variation in the engine tends not to increase immediately after the load on the engine has come closer to the upper limit load but to increase after the state where the load on the engine is close to the upper limit load continues for a certain time period, which accordingly makes vibration and noise so large as to be sensed by the body of the occupant. Therefore, as described above, by performing the switching to the all-cylinder operation mode based on the degree-of-continuation parameter, it is possible not only to suppress the vibration and noise of the engine during the partial-cylinder operation mode but also to attain excellent fuel economy by continuing the partial-cylinder operation mode as long as possible.

Preferably, the degree-of-continuation parameter is a cumulative value of a difference between the load on the engine within the predetermined range of load and the second reference value.

With the configuration of this preferred embodiment, whether or not the operation mode should be switched to the all-cylinder operation mode is determined based on the cumulative value of the difference between the load on the engine within the predetermined range of load and the second reference value. When the load on the engine is within the above range of load, larger vibration and noise are more liable to occur as the aforementioned difference, i.e. the gap between the load on the engine and the second reference value is larger or as duration of the state of the load on the engine being within the range of load is longer. Since both the difference and the duration of the state are reflected on the cumulative value defined as described above, larger vibration and noise becomes more liable to occur as the cumulative value is larger. Therefore, according to the present invention, the switching to the all-cylinder operation mode can be performed in proper timing based on the cumulative value.

Preferably, the degree-of-continuation parameter is duration of the state where the load on the engine is within the predetermined range of load.

With the configuration of this preferred embodiment, whether or not the operation mode should be switched to the all-cylinder operation mode is determined based on duration of the state where the load on the engine is within the predetermined range of load. Therefore, it is possible to perform the switching to the all-cylinder operation mode by simple processing according to the duration.

Preferably, when the degree-of-continuation parameter becomes larger than a predetermined switching reference value, the second switching determination means determines that the operation mode should be switched to the all-cylinder operation mode, and the control system further comprises rotational speed-detecting means for detecting a rotational speed of the engine, and correction means for correcting one of the degree-of-continuation parameter and the switching reference value according to the detected rotational speed of the engine.

With the configuration of this preferred embodiment, when the degree-of-continuation parameter becomes larger than the predetermined switching reference value, it is determined that the operation mode should be switched to the all-cylinder operation mode. Further, the degree-of-continuation parameter or the switching reference value is corrected by the correction means according to the detected rotational speed of the engine. Generally, torque variation is liable to occur when the rotational speed of the engine is low, and hence vibration and noise are also liable to occur. Therefore, by correcting the degree-of-continuation parameter or the switching reference value for use in the determination of the switching to the all-cylinder operation mode by the rotational speed of the engine, the switching can be performed in suitable timing dependent on the rotational speed of the engine.

Preferably, the engine is provided with an electric motor for assisting a driving force of the engine.

With the configuration of this preferred embodiment, the driving force of the engine is assisted by the electric motor, whereby actual load on the engine can be reduced by the amount of assistance of the electric motor. This makes it possible to lengthen the time period over which the partial-cylinder operation mode is executed without increasing vibration and noise, thereby making it possible to further improve fuel economy.

The above and other objects, features, and advantages of the present invention will become more apparent from the following detailed description taken in conjunction with the accompanying drawings.

DETAILED DESCRIPTION OF PREFERRED EMBODIMENTS

Figure 1:
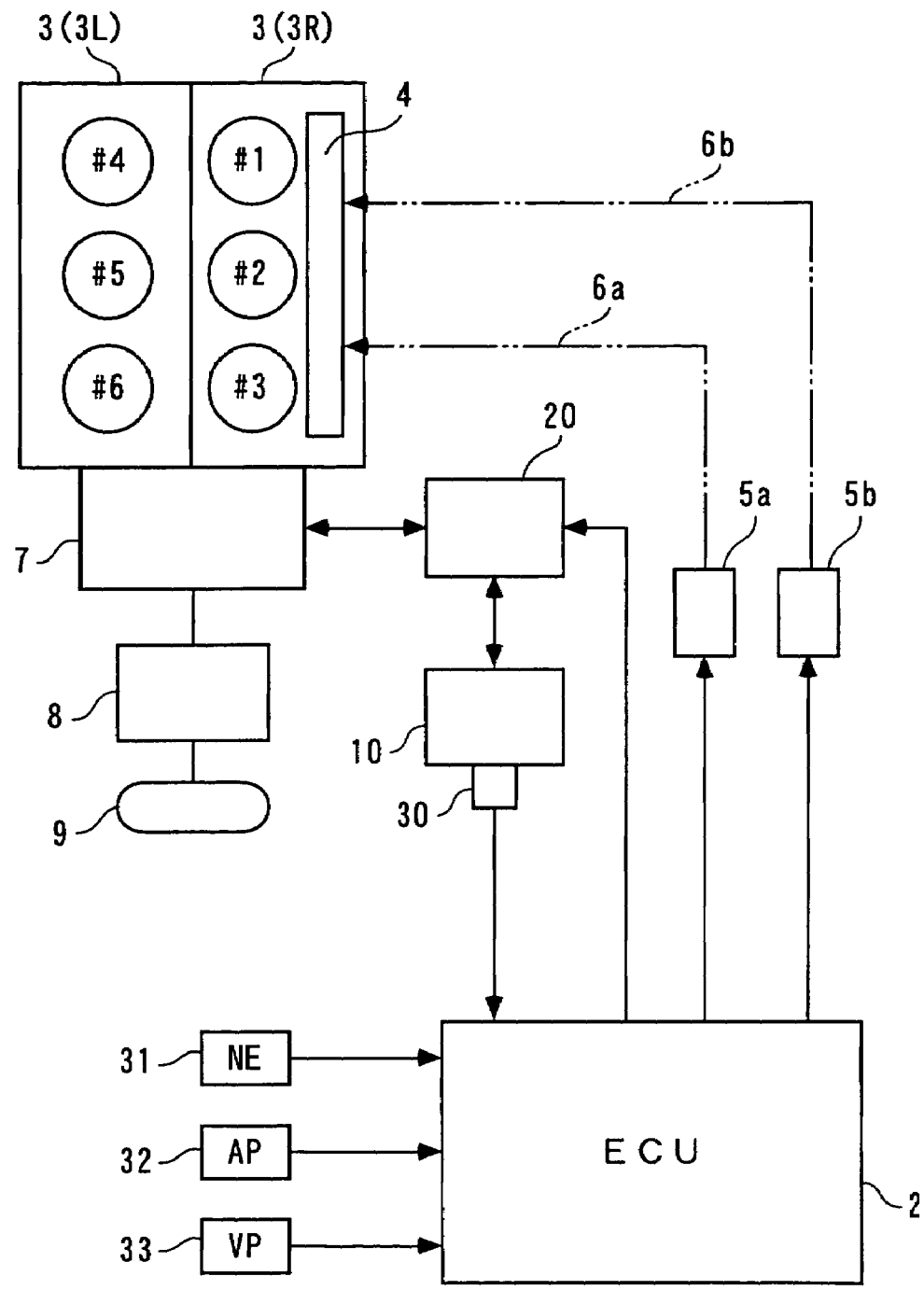
FIG. 1 is a schematic view of a control system according to a first embodiment of the present invention, and a variable-cylinder internal combustion engine controlled by the control system.

Hereafter, a control system for a variable-cylinder internal combustion engine, according to a first embodiment of the present invention, will be described with reference to the drawings. Referring first to FIG. 1, there is schematically shown the arrangement of a control system 1 according to the present invention, and a variable-cylinder internal combustion engine (hereinafter simply referred to as "the engine") 3, which is controlled by the control system 1.

The engine 3 is a V-type six-cylinder DOHC gasoline engine installed on a vehicle (not shown), and includes a right bank 3R of three cylinders #1, #2, and #3 (a plurality of cylinders, some of the plurality of cylinders), and a left bank 3L of three cylinders #4, #5, and #6 (the plurality of cylinders). Further, the right bank 3R is provided with a cylinder-deactivating mechanism 4 for carrying out a partial-cylinder operation mode, described hereinafter.

The cylinder-deactivating mechanism 4 is connected to a hydraulic pump, not shown, via oil passages 6a and 6b. Arranged between the hydraulic pump and the cylinder-deactivating mechanism 4 are a solenoid valve 5a (switching execution means) for intake valves and a solenoid valve 5b (switching execution means) for exhaust valves. Both the solenoid valves 5a and 5b are of a normally-closed type, and open the oil passages 6a and 6b, respectively, when they are turned on by drive signals delivered from an ECU 2, referred to hereinafter. In the partial-cylinder operation mode of the engine 3, both of the solenoid valves 5a and 5b are turned on to open the oil passages 6a and 6b, whereby oil pressure is supplied from the hydraulic pump to the cylinder-deactivating mechanism 4. As a result, the intake valve and an intake cam associated therewith, not shown, and the exhaust valve and an exhaust cam associated therewith, not shown, in each of the cylinders #1 to #3 of the right bank 3R, are disconnected from each other, whereby the intake valves and the exhaust valves of these cylinders #1 to #3 are held in a deactivated state (closed state).

For an all-cylinder operation mode of the engine 3, inversely to the above, both of the solenoid valves 5a and 5b are turned off to close the oil passages 6a and 6b, whereby the supply of oil pressure from the hydraulic pump to the cylinder-deactivating mechanism 4 is stopped. This terminates the disconnection of the intake valve and the intake cam and that of the exhaust valve and the exhaust cam in each of the cylinders #1 to #3 of the right bank 3R, whereby the intake valves and the exhaust valves of these cylinders #1 to #3 are actuated.

Intake pipes (none of which are shown) are connected to the six cylinders #1 to #6 via an intake manifold. The intake manifold has branch portions with injectors (none of which are shown) inserted therein such that the injectors face respective intake ports (none of which are shown) of the cylinders. The injectors are controlled by drive signals from the ECU 2 such that fuel is injected from all the injectors during the all-cylinder operation mode. On the other hand, during the partial-cylinder operation mode, the injectors are controlled such that fuel injection by the three injectors for the right bank 3R is stopped.

Thus, the cylinders #1 to #3 of the right bank 3R are deactivated during the partial-cylinder operation mode by deactivation of the intake valves and the exhaust valves thereof and interruption of fuel injection from the associated injectors, whereas during the all-cylinder operation mode, all the six cylinders #1 to #6 are operated in the order of #1→#5→#3→#6→#2→#4.

The vehicle is equipped with not only the engine 3 but also a motor 7 (electric motor) as a drive source, and operated in an engine-drive mode in which the vehicle is driven only by the engine 3, or a motor-assist mode in which the vehicle is driven by the engine 3 with the driving force thereof being assisted by the motor 7. The motor 7 is directly connected to a crankshaft (not shown) of the engine 3, and connected to driving wheels 9 of the vehicle via an automatic transmission 8 including a torque converter (not shown), and so forth.

The motor 7 is connected to a battery 10 as a drive source thereof via a power drive unit (hereinafter referred to as "the PDU") 20 which is implemented by an electric circuit comprised of an inverter. Further, the motor 7 also serves as a generator that carries out power generation using rotating energy of the driving wheels 9. The electric energy generated by the motor 7 charges the battery 10 (for regeneration) via the PDU 20. Further, the motor 7 is connected to the ECU 2 via the PDU 20.

The battery 10 is provided with a current-voltage sensor 30. The current-voltage sensor 30 detects values of current and voltage of electricity inputted to and outputted from the battery 10, and delivers signals indicative of the detected values of current and voltage to the ECU 2. The ECU 2 calculates a remaining charge of the battery 10.

Further, the ECU 2 receives a signal indicative of engine speed NE from an engine speed sensor 31 (load-detecting means, rotational speed-detecting means), a signal indicative of an accelerator pedal opening AP from an accelerator pedal opening sensor 32 (load-detecting means), and a signal indicative of vehicle speed VP from a vehicle speed sensor 33. The accelerator pedal opening AP indicates a stepped-on amount of an accelerator pedal (not shown).

The ECU 2 is implemented by a microcomputer including an I/O interface, a CPU, a RAM, and a ROM. The detection signals from the aforementioned sensors 30 to 33 are inputted to the CPU after the I/O interface performs A/D conversion thereon. The ECU 2 determines whether or not the partial-cylinder operation mode should be executed, based on the above-mentioned detection signals, in accordance with control programs read from the ROM. Further, based on the results of the determinations, the ECU 2 controls drive signals to the solenoid valves 5a and 5b, a fuel injection time period over which each injector injects fuel, and ignition timing of each spark plug, to thereby operate the engine in the partial-cylinder operation mode or in the all-cylinder operation mode. It should be noted that in the present embodiment, the ECU 2 implements the load-detecting means, first switching determination means, degree-of-continuation parameter-calculating means, second switching determination means, switching execution means, and correction means.

Figure 2:
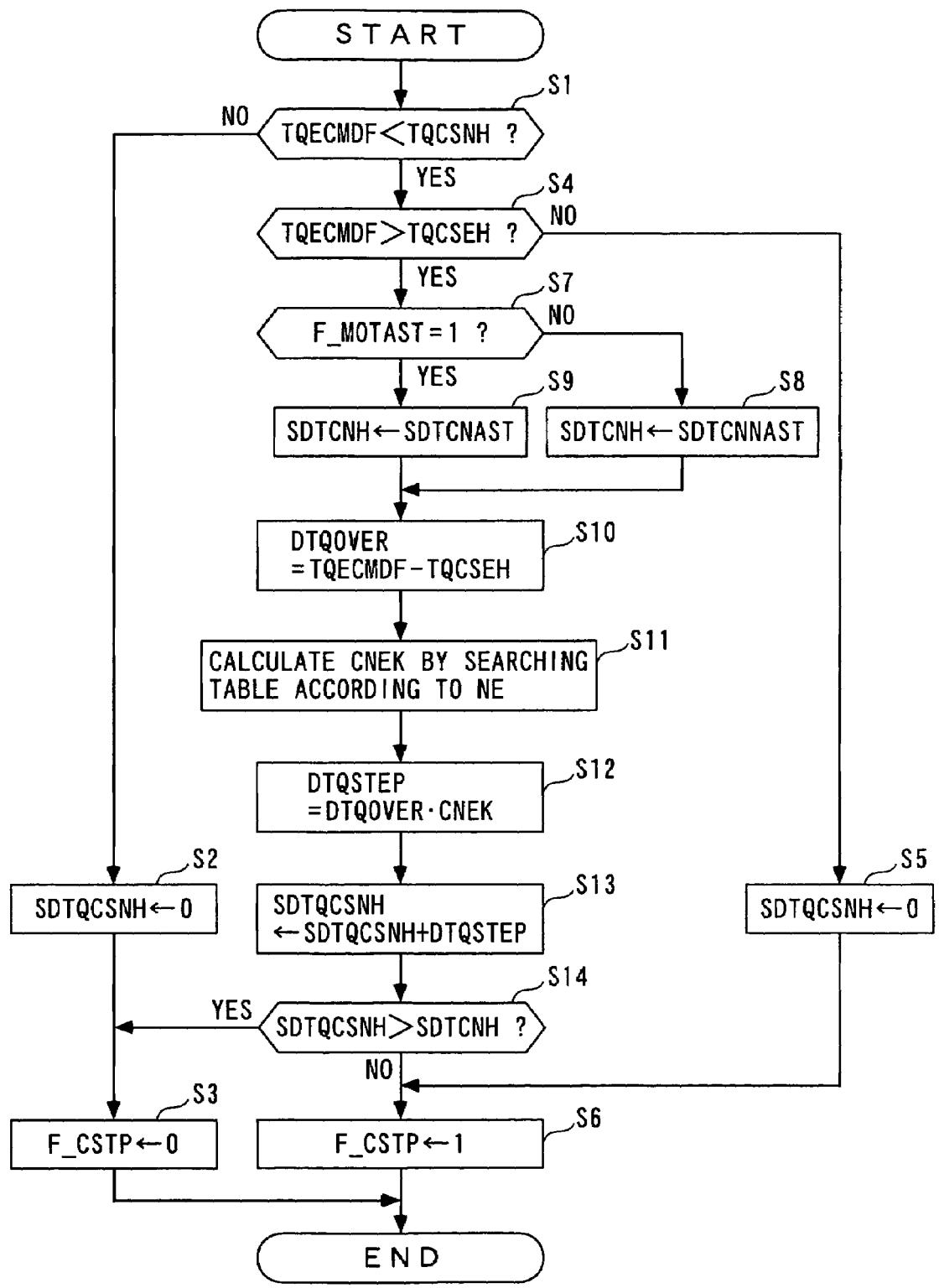
FIG. 2 is a flowchart showing an execution-determining process for determining whether a partial-cylinder operation mode should be executed.
Figure 3:
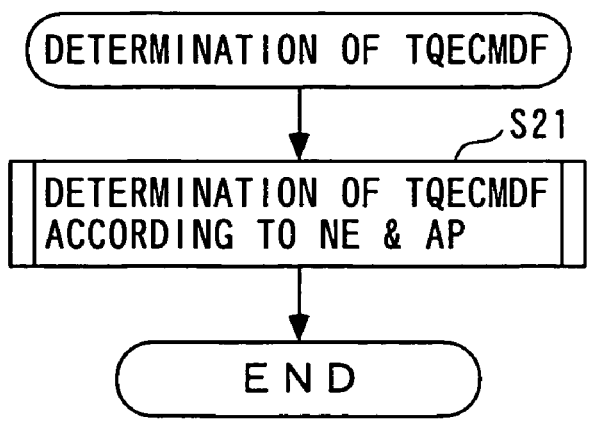
FIG. 3 is a flowchart showing a process for determining a demanded torque TQECMDF.

FIG. 2 is a flowchart showing an execution-determining process for determining whether the partial-cylinder operation mode should be executed. The present process is carried out at intervals of a predetermined time period (e.g. 100 msec). First, in a step 1 (shown as S1 in abbreviated form in FIG. 2; the following steps are also shown in abbreviated form), it is determined whether or not demanded torque TQECMDF (load on the engine) is smaller than a first reference value TQCSNH. The demanded torque TQECMDF is torque demanded of the whole of the engine 3 and the motor 7, and determined by searching a map (not shown) according to the engine speed NE and the accelerator pedal opening AP in a step 21 of a TQECMDF-determining process shown in FIG. 3. In this map, the demanded torque TQECMDF is set to a larger value as the engine speed NE is higher and as the accelerator pedal opening AP is larger. The above-described first reference value TQCSNH corresponds to an upper limit of torque which can be outputted in the partial-cylinder operation mode (hereinafter referred to as "the upper limit torque"), and is determined by searching a map (not shown) according to the engine speed NE and the vehicle speed VP. In this map, the first reference value TQCSNH is set to a larger value as the engine speed NE is higher, and as the vehicle speed VP is larger.

If the answer to the question of the step 1 is negative (NO), i.e. if TQECMDF≧TQCSNH holds, a torque difference cumulative value SDTQCSNH (degree-of-continuation parameter), referred to hereinafter, is reset to a value of 0 (step 2). Further, since TQECMDF≧TQCSNH holds, it is judged that the demanded torque TQECMDF exceeds the upper limit torque, and hence it is determined that the all-cylinder operation mode should be executed. Then, to indicate the fact, a partial-cylinder operation mode flag F_CSTP is set to 0 (step 3), followed by terminating the present process. In accordance with the termination of the process, the engine 3 is operated in the all-cylinder operation mode.

On the other hand, if the answer to the question of the step 1 is affirmative (YES), i.e. if TQECMDF<TQCSNH holds, it is determined whether or not the demanded torque TQECMDF is larger than a second reference value TQCSEH (step 4). The second reference value TQCSEH corresponds to an upper limit of torque which cannot cause the vibration and noise of the engine 3 even if the partial-cylinder operation mode is executed, and is set to a value obtained by subtracting a predetermined value from the first reference value TQCSNH. If the answer to the question of the step 4 is negative (NO), i.e. if TQECMDF≦TQCSEH holds, the torque difference cumulative value SDTQCSNH is reset to a value of 0 (step 5). Further, since TQECMDF≦TQCSEH holds, it is judged that there is no fear of the vibration and noise of the engine 3 being caused even if the partial-cylinder operation mode is executed, and hence determined that the partial-cylinder operation mode should be executed. Then, to indicate the fact, the partial-cylinder operation mode flag F_CSTP is set to 1 (step 6), and the present process is terminated, thereby causing the engine 3 to be operated in the partial-cylinder operation mode.

On the other hand, if the answer to the question of the step 4 is affirmative (YES), i.e. if TQECMDF>TQCSEH holds, which means that the demanded torque TQECMDF is between the first reference value TQCSNH and the second reference value TQCSEH, it is determined whether or not a motor assist flag F_MOTAST is equal to 1 (step 7). The motor assist flag F_MOTAST is set to 1, when the engine 3 is in the motor-assist mode, whereas when the engine 3 is in the engine-drive mode, it is set to 0.

If the answer to the question of the step 7 is negative (NO), i.e. if the engine 3 is in the engine-drive mode, a switching reference value SDTCNH is set to a predetermined engine-drive mode reference value SDTCNNAST (step 8). As will be described hereinafter, the switching reference value SDTCNH is used for determining whether the partial-cylinder operation mode should be executed.

On the other hand, if the answer to the question of the step 7 is affirmative (YES), i.e. if the engine 3 is in the motor-assist mode, the switching reference value SDTCNH is set to a predetermined motor-assist mode reference value SDTCNAST (step 9). The motor-assist mode reference value SDTCNAST is set to a value larger than the engine-drive mode reference value SDTCNNAST.

Figure 4:
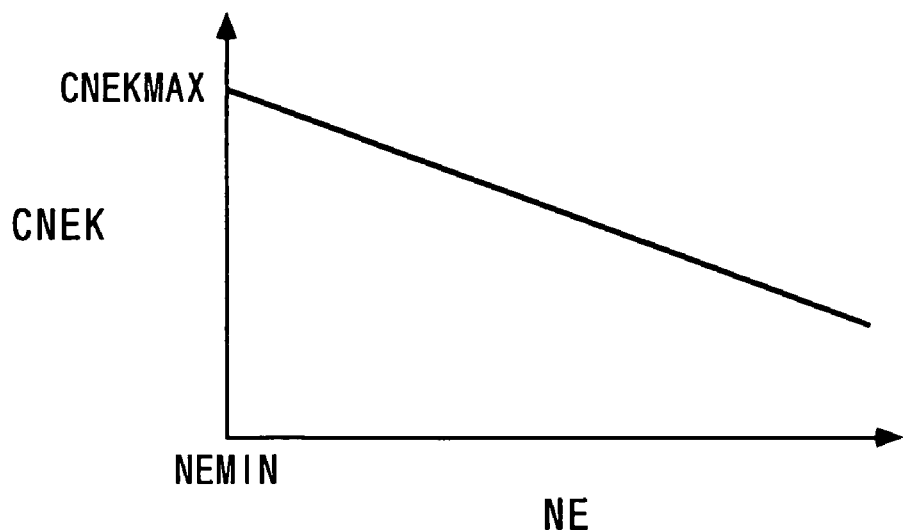
FIG. 4 is a diagram showing an example of a CNEK table for use in the FIG. 2 process.

In a step 10 following the step 8 or 9, a torque difference DTQOVER is calculated by subtracting the second reference value TQCSEH from the demanded torque TQECMDF. Then, a correction coefficient CNEK is calculated by searching a CNEK table shown in FIG. 4 (step 11). In this table, the correction coefficient CNEK is set to a larger positive value, as the engine speed NE is lower, and when the positive engine speed NE assumes a lowest value NEMIN, it is set to a maximum value CNEKMAX (e.g. 1.0). Then, a corrected addend term DTQSTEP of the torque difference is calculated by multiplying the torque difference DTQOVER calculated in the step 10 by the above correction coefficient CNEK (step 12). Subsequently, the calculated corrected addend term DTQSTEP is added to the torque difference cumulative value SDTQCSNH obtained by cumulative calculation thereof up to the time point to thereby calculate the current torque difference cumulative value SDTQCSNH (step 13).

As described hereinabove, when the demanded torque TQECMDF is between the first reference value TQCSNH and the second reference value TQCSEH (hereinafter referred to as "the switching torque range") (YES to steps 1 and 4), the torque difference cumulative value SDTQCSNH is calculated by cumulative calculation of the corrected addend term DTQSTEP obtained by correcting the torque difference DTQOVER which is the difference between the demanded torque TQECMDF and the second reference value TQCSEH (steps 10 to 13). As is clear from the above calculation method, both the magnitude of the gap between the demanded torque TQECMDF and the second reference value TQCSEH, and duration of a state in which the demanded torque TQECMDF is within the switching torque range are reflected on the torque difference cumulative value SDTQCSNH, and hence larger vibration and noise are liable to occur as the torque difference cumulative value SDTQCSNH is larger. Further, the torque difference cumulative value SDTQCSNH is represented by the area of a hatched portion in FIG. 6.

In a step 14 following the step 13, it is determined whether or not the torque difference cumulative value SDTQCSNH is larger than the switching reference value SDTCNH set in the step 8 or 9.

If the answer to this question is negative (NO), i.e. if the torque difference cumulative value SDTQCSNH is smaller than the switching reference value SDTCNH, it is judged that there is no fear of occurrence of large vibration and noise of the engine 3, and hence determined that the partial-cylinder operation mode should be continued, so that the step 6 is executed.

On the other hand, if the answer to the question of the step 14 is affirmative (YES), i.e. if the torque difference cumulative value SDTQCSNH is larger than the switching reference value SDTCNH, it is judged that there can occur large vibration and noise of the engine 3 if the partial-cylinder operation mode is continued, and hence determined that the partial-cylinder operation mode should be stopped, so that the step 3 is executed.

Next, an example of the operation of the above-described process will be explained in comparison with a comparative example with reference to FIGS. 5 and 6. The comparative example shown in FIG. 5 is an example in which determination of whether the partial-cylinder operation mode was to be executed was performed only based on the relationship in magnitude between the demanded torque TQECMDF and the second reference value TQCSEH.

Figure 5:
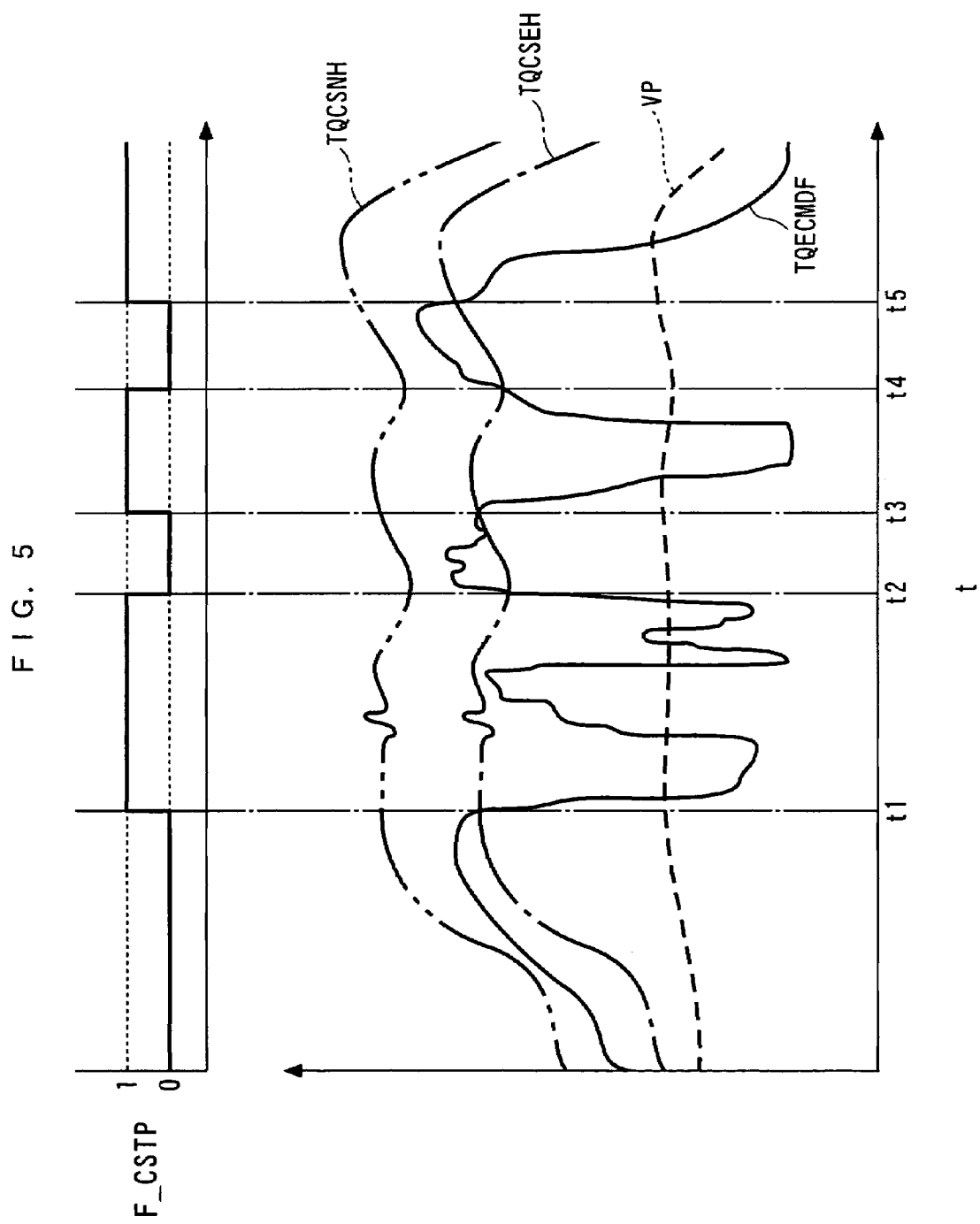
FIG. 5 is a diagram showing a comparative example of the FIG. 6 operation.

As shown in FIG. 5, in the comparative example, the first reference value TQCSNH set according to the vehicle speed VP, as described above, varies with the vehicle speed VP, and accordingly, the second reference value TQCSEH, which is obtained by subtracting the predetermined value from the first reference value TQCSNH, varies in the same manner. Further, when the demanded torque TQECMDF is smaller than the second reference value TQCSEH (time periods t1 to t2, t3 to t4, and after t5), the partial-cylinder operation mode flag F_CSTP is set to 1, the partial-cylinder operation mode is executed. Otherwise, the partial-cylinder operation mode flag F_CSTP is set to 0, whereby the all-cylinder operation mode is carried out. As described above, in this comparative example, during the partial-cylinder operation mode, the operation mode is switched to the all-cylinder operation mode simultaneously when the demanded torque TQECMDF becomes larger than the second reference value TQCSEH, and therefore the time period over which the partial-cylinder operation mode is executed is shortened.

Figure 6:
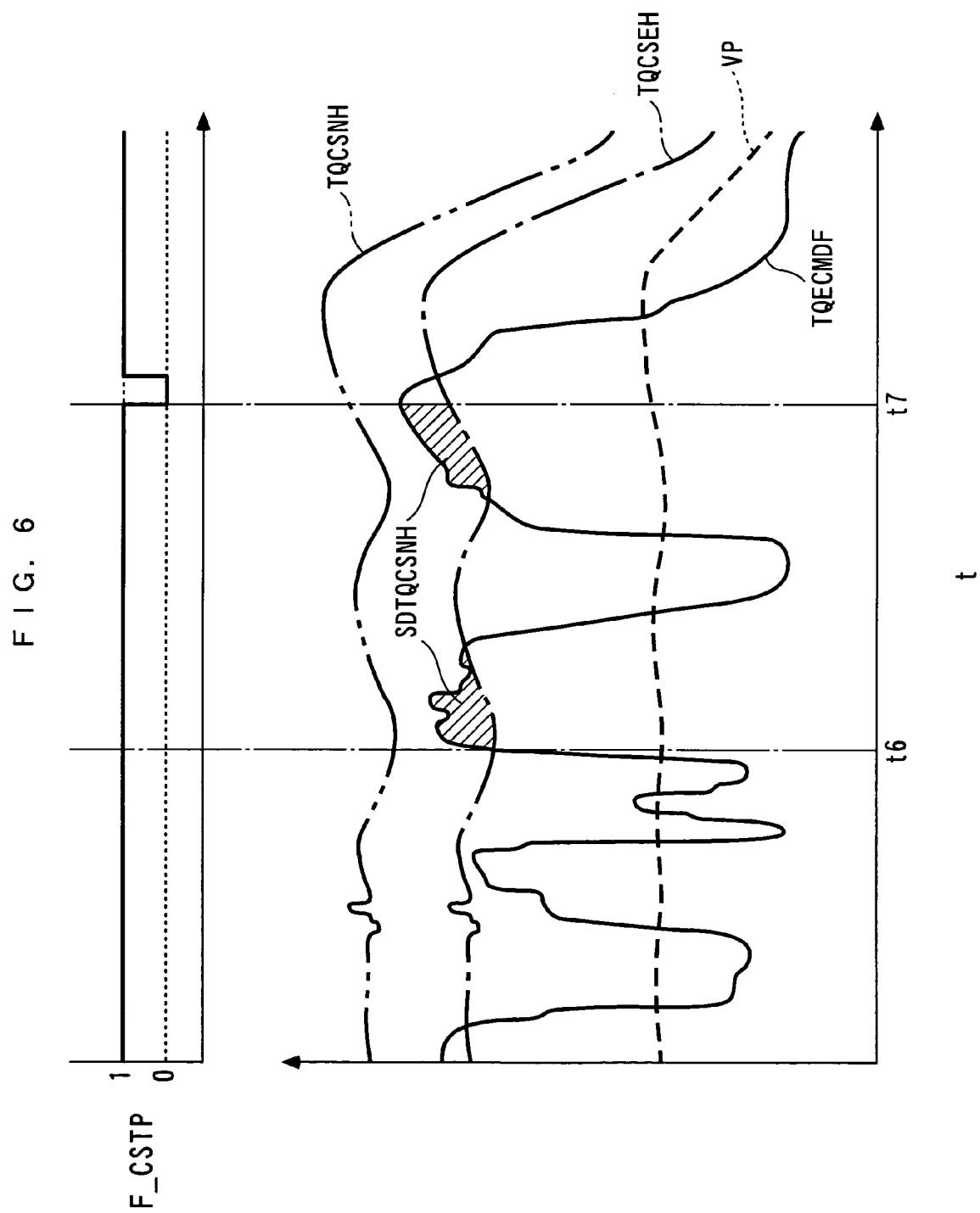
FIG. 6 is a diagram showing an example of operation realized by the FIG. 2 process.

In contrast, as shown in FIG. 6, in the present embodiment, even when the demanded torque TQECMDF becomes larger than the second reference value TQCSEH during the partial-cylinder operation mode (time t6), the operation mode is not switched to the all-cylinder operation mode unless the torque difference cumulative value SDTQCSNH calculated as described above becomes larger than the switching reference value SDTCNH, so that the partial-cylinder operation mode is continued. Then, only after the torque difference cumulative value SDTQCSNH becomes larger than the switching reference value SDTCNH (time t7), the operation mode is switched to the all-cylinder operation mode. Therefore, it is possible to lengthen the time period over which the partial-cylinder operation mode is executed to thereby attain excellent fuel economy while suppressing vibration and noise.

As described hereinabove, according to the present embodiment, when the demanded torque TQECMDF is not smaller than the first reference value TQCSNH, that is, the upper limit torque (Yes to step 1), it is determined that the all-cylinder operation mode should be executed (step 3). Therefore, when the demanded torque TQECMDF becomes larger than the upper limit torque during the partial-cylinder operation mode, it is possible to switch the operation mode to the all-cylinder operation mode, thereby making it possible positively output the demanded torque TQECMDF.

Further, during the partial-cylinder operation mode, when the demanded torque TQECMDF is between the first reference value TQCSNH and the second reference value TQCSEH, that is, within the switching torque range (YES to steps 1 and 4), the torque difference cumulative value SDTQCSNH corresponding to the cumulative value of the difference between the demanded torque TQECMDF in the above state and the second reference value TQCSEH is calculated (steps 10 to 13). Then, when the torque difference cumulative value SDTQCSNH becomes larger than the switching reference value SDTCNH (YES to step 14), it is determined that the all-cylinder operation mode should be executed (step 3), so that the operation mode is switched to the all-cylinder operation mode. As described hereinbefore, the difference between the demanded torque TQECMDF and the second reference value TQCSEH in the state where the demanded torque TQECMDF is within the switching torque range and the duration of the state are reflected on the torque difference cumulative value SDTQCSNH, so that larger vibration and noise are more liable to occur as the torque difference cumulative value SDTQCSNH is larger. Accordingly, by switching the operation mode to the all-cylinder operation mode based on the torque difference cumulative value SDTQCSNH, as described above, the switching can be carried out in suitable timing, and therefore it is possible to attain excellent fuel economy while suppressing the vibration and noise of the engine 3 in the partial-cylinder operation mode.

Furthermore, the torque difference cumulative value SDTQCSNH is calculated by cumulative calculation of the corrected addend term DTQSTEP obtained by correcting the torque difference DTQOVER by the correction coefficient CNEK. As described hereinabove, as the engine speed NE is lower, the correction coefficient CNEK is set to a larger value, and accordingly the torque difference cumulative value SDTQCSNH is calculated as a larger value. On the other hand, when the engine speed NE is low, torque variation is liable to increase, which makes large vibration and noise more liable to occur. Therefore, by setting the correction coefficient CNEK as described above, the torque difference cumulative value SDTQCSNH is made to more readily exceed the switching reference value SDTCNH when the engine speed NE is low, whereby it is possible to switch the operation mode to the all-cylinder operation mode earlier. As described above, the switching to the all-cylinder operation mode can be performed in suitable timing dependent on the engine speed NE. Further, since the above-described correction by the correction coefficient CNEK is performed whenever the torque difference cumulative value SDTQCSNH is calculated, it is possible to obtain the above-described effects more excellently.

Further, during the motor-assist mode, the engine 3 is assisted by the motor 7 to thereby reduce torque actually output from the engine 3, which makes it difficult for torque variation to occur during the partial-cylinder operation mode. Therefore, as described above, by setting the switching reference value SDTCNH to a larger value during the motor-assist mode than during the engine-drive mode, it is made difficult for the torque difference cumulative value SDTQCSNH to exceed the switching reference value SDTCNH, whereby the switching to the all-cylinder operation mode can be performed in suitable timing depending on whether or not the engine 3 is assisted by the motor 7. This makes it possible to lengthen the time period over which the partial-cylinder operation mode is executed while suppressing vibration and noise.

Although in the present embodiment, the torque difference cumulative value SDTQCSNH is reset to a value of 0 (step 5) when the demanded torque TQECMDF becomes smaller than the second reference value TQCSEH in calculation of the torque difference cumulative value SDTQCSNH during the partial-cylinder operation mode, the resetting may be performed when a predetermined time period has elapsed after the demanded torque TQECMDF became smaller than the second reference value TQCSEH. Such a setting makes it possible to switch the operation mode to the all-cylinder operation mode in such cases where the demanded torque TQECMDF enters the switching torque range in a short time period after the demanded torque TQECMDF becomes smaller than the second reference value TQCSEH, thereby making it possible to prevent large vibration and noise from being caused under such circumstances.

Figure 7:
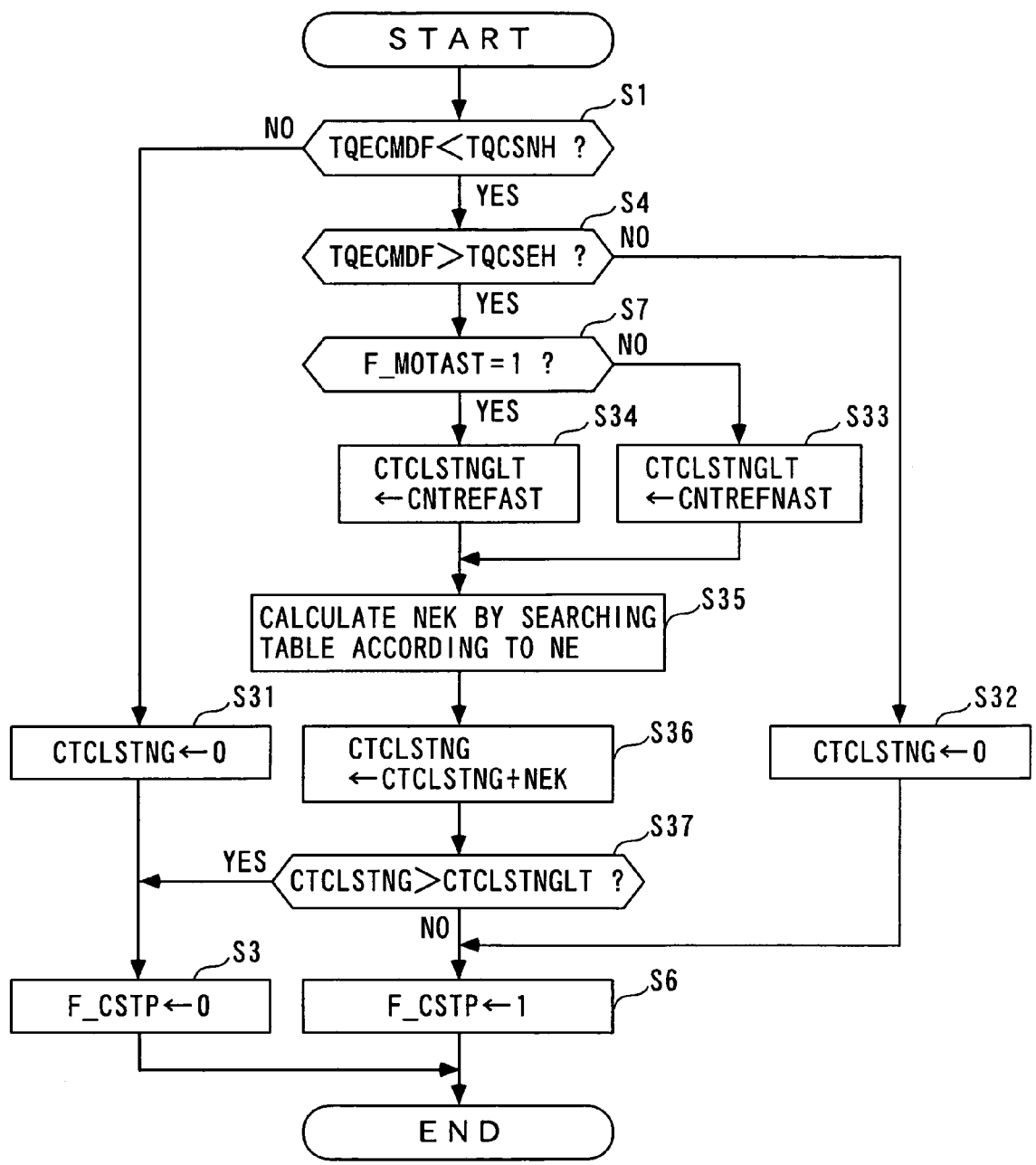
FIG. 7 is a flowchart showing an execution-determining process for determining whether the partial-cylinder operation mode should be executed, according to a second embodiment of the present invention.

Next, an execution-determining process for determining execution of the partial-cylinder operation mode, according to a second embodiment of the present invention, will be described with reference to FIG. 7. This determining process is distinguished from the FIG. 2 determining process according to the first embodiment only in that the duration of the state in which the demanded torque TQECMDF is within the switching torque range is employed as the degree-of-continuation parameter. It should be noted that in FIG. 7, steps identical to those of the process in FIG. 2 are designated by the same step numbers. The following description will be mainly given of steps different from those of the FIG. 2 process.

If the answer to the question of the step 1 is negative (NO), i.e. if TQECMDF≧TQCSNH holds, a counter cumulative value CTCLSTNG (degree-of-continuation parameter), described hereinafter, is reset to a value of 0 (step 31), and the step 3 is carried out, followed by terminating the present process. Further, if the answer to the question of the step 4 is negative (NO), i.e. if TQECMDF≦TQCSENH holds, the counter cumulative value CTCLSTNG is reset to a value of 0 (step 32), and the step 6 is carried out, followed by terminating the present process.

Furthermore, if the answer to the question of the step 7 is negative (NO), i.e. if F_MOTAST=0 holds, which means that the engine 3 is in the engine-drive mode, a switching reference value CTCLSTNGLT is set to a predetermined engine-drive mode reference value CNTREFNAST (step 33).

On the other hand, if the answer to the question of the step 7 is affirmative (YES), i.e. if the engine 3 is in the motor-assist mode, the switching reference value CTCLSTNGLT is set to a predetermined motor-assist mode reference value CNTREFAST larger than the above engine-drive mode reference value CNTREFNAST (step 34).

Figure 8:
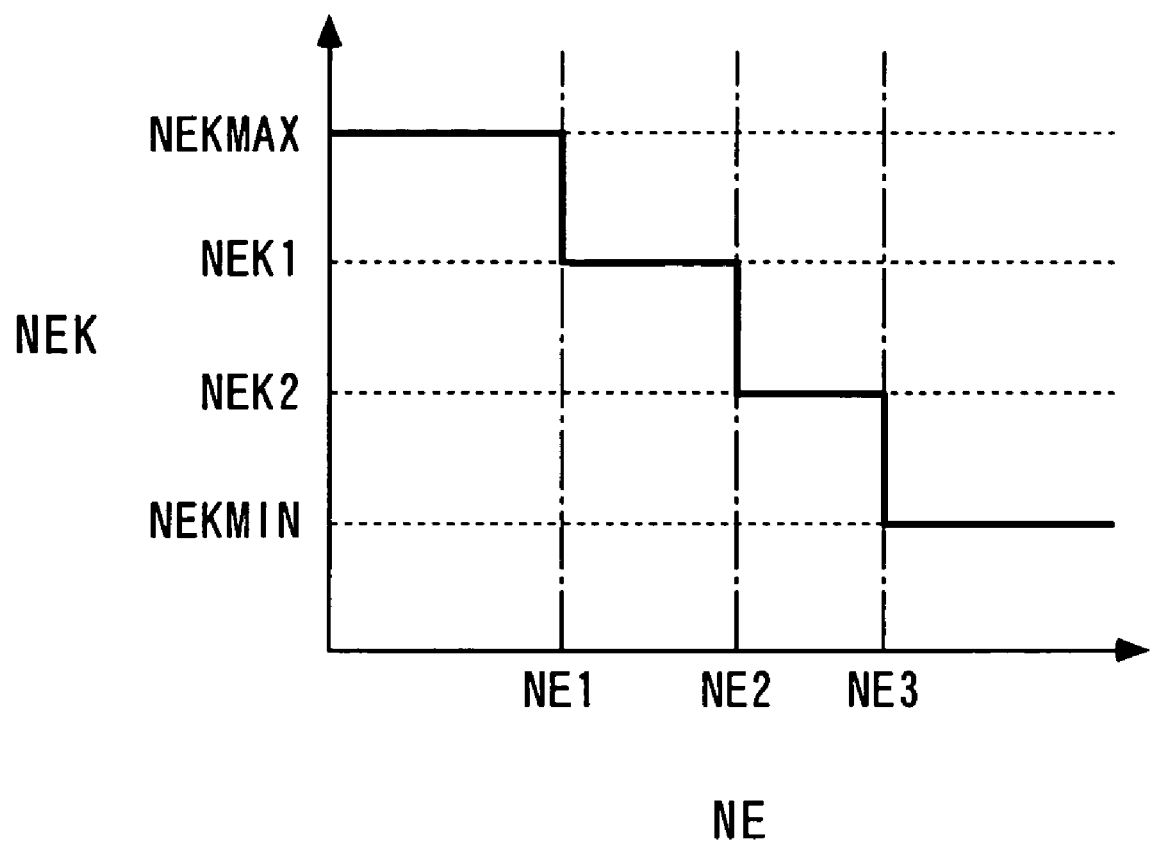
FIG. 8 is a diagram showing an example of a CNEK table for use in the FIG. 7 process.

In a step 35 following the step 33 or 34, a counter addend value NEK is determined by searching a NEK table shown in FIG. 8 according to the engine speed NE. In FIG. 8, NE 1 to NE3 (NE1<NE2<NE3) represent first to third predetermined values of the engine speed NE, respectively. In the NEK table, the counter addend value NEK is set to a larger value as the engine speed NE is lower. More specifically, the counter addend value NEK is set to a maximum value NEEKMAX (e.g. 4) when NE<NE1 holds, a predetermined value NEK1 (e.g. 3) when NE1≦NE≦NE2 holds, a predetermined value NEK2 (e.g. 2) when NE2≦NE≦NE3 holds, and a minimum value NEKMIN (e.g. 1) when NE≧NE3 holds.

Then, the set counter addend value NEK is added to the counter cumulative value CTCLSTNG obtained by cumulative calculation thereof up to the time point to thereby calculate the current counter cumulative value CTCLSTNG (step 36). The counter cumulative value CTCLSTNG thus calculated corresponds to the duration of the state in which the demanded torque TQECMDF is within the switching torque range, as is apparent from the method of calculating the same.

Next, it is determined whether or not the calculated counter cumulative value CTCLSTNG is larger than the switching reference value CTCLSTNGLT set in the step 33 or 34 (step 37). If the answer to this question is negative (NO), i.e. if CTCLSTNG≦CTCLSTNGLT holds, which means that the duration of the state in which the demanded torque TQECMDF is within the switching torque range is short, it is judged that there is no fear of occurrence of large vibration and noise of the engine 3, and hence determined that the partial-cylinder operation mode should be executed, so that the step 6 is executed.

On the other hand, if the answer to the question of the step 37 is affirmative (YES), i.e. if CTCLSTNG>CTCLSTNGLT holds, it is judged that the duration of the state in which the demanded torque TQECMDF is within the switching torque range is long, and there can occur large vibration and noise of the engine 3 if the partial-cylinder operation mode is continued, and hence determined that the partial-cylinder operation mode should be stopped, so that the step 3 is executed.

As described hereinabove, according to the present embodiment, during the partial-cylinder operation mode, when the counter cumulative value CTCLSTNG corresponding to the duration of the state in which the demanded torque TQECMDF is within the switching torque range is large, and hence the duration is long, it is determined that the operation mode should be switched to the all-cylinder operation mode. As described hereinbefore, as the duration is longer, large vibration and noise of the engine 3 are more liable to occur in the partial-cylinder operation mode. Therefore, by performing the switching to the all-cylinder operation mode as described above, it can be carried out in proper timing, similarly to the first embodiment. Further, differently from the first embodiment, there is no need to calculate the torque difference DTQOVER, which makes it possible to reduce computational load on the ECU 2.

Further, the counter addend value NEK is set to a larger value as the engine speed NE is lower, and accordingly the counter cumulative value CTCLSTNG is calculated as a larger value. This makes it possible to perform the switching to the all-cylinder operation mode in suitable timing dependent on the engine speed NE, similarly to the first embodiment.

Furthermore, similarly to the first embodiment, the switching reference value CTCLSTNGLT is set to a larger value during the motor-assist mode than during the engine-drive mode, and therefore it is possible to perform the switching to the all-cylinder operation mode in suitable timing dependent on whether or not the engine 3 is assisted by the motor 7.

Although in the present embodiment, the counter cumulative value CTCLSTNG is reset to a value of 0 (step 32) when the demanded torque TQECMDF becomes smaller than the second reference value TQCSEH in calculation of the counter cumulative value CTCLSTNG during the partial-cylinder operation mode, this resetting may be performed when a predetermined time period elapses after the demanded torque TQECMDF becomes smaller than the second reference value TQCSEH, for the same reason given in the description of the first embodiment.

It should be noted that the present invention is not limited to the embodiments described above, but can be practiced in various forms. For example, although in the above-described embodiments, six cylinders in total are provided and three of them are deactivated in the partial-cylinder operation mode, this is only by way of example and hence not limitative, but the respective numbers of provided cylinders and deactivated ones of them may be set to respective desired numbers. Further, the number of the deactivated cylinders may be variably controlled e.g. to a desired one of 1 to 5 with respect to 6 as the number of cylinders for operation.

Furthermore, although in the above-described embodiments, the demanded torque TQECMDF is used as load on the engine 3, the output of the engine 3 or the like may be used in place of the demanded torque TQECMDF. Further, although in the above-described embodiments, the torque difference cumulative value SDTQCSNH and the counter cumulative value CTCLSTNG are corrected according to the engine speed NE, this is not limitative, but the switching reference values SDTCNH and CTCLSTNGLT may be corrected in place of the torque difference cumulative value SDTQCSNH and the counter cumulative value CTCLSTNG. In this case, the switching reference values SDTCNH and CTCLSTNGLT are set to smaller values as the engine speed NE is lower. Further, although in the above-described embodiments, the second reference value TQCSEH is set to the value obtained by subtracting the predetermined value from the first reference value TQCSNH, the second reference value TQCSEH may be set independently of the first reference value TQCSNH.

It is further understood by those skilled in the art that the foregoing are preferred embodiments of the invention, and that various changes and modifications may be made without departing from the spirit and scope thereof.

What is claimed is:

1. A control system for a variable-cylinder internal combustion engine which is operated by switching an operation mode between an all-cylinder operation mode in which all of a plurality of cylinders are put in operation and a partial-cylinder operation mode in which some of the plurality of cylinders are deactivated, comprising:

load-detecting means for detecting load on the engine;

first switching determination means for determining that the operation mode should be switched to the all-cylinder operation mode, when the detected load on the engine is larger than a first reference value, during the partial-cylinder operation mode;

degree-of-continuation parameter-calculating means for calculating a degree-of-continuation parameter indicative of a degree of continuation of a state where the load on the engine is within a predetermined range of load between the first reference value and a second reference value smaller than the first reference value, during the partial-cylinder operation mode;

second switching determination means for determining based on the calculated degree-of-continuation parameter whether or not the operation mode should be switched to the all-cylinder operation mode; and switching execution means for executing switching from the partial-cylinder operation mode to the all-cylinder operation mode based on results of determinations by said first switching determination means and said second switching determination means.

2. A control system as claimed in claim 1, wherein the degree-of-continuation parameter is a cumulative value of a difference between the load on the engine within the predetermined range of load and the second reference value.

3. A control system as claimed in claim 1, wherein the degree-of-continuation parameter is duration of the state where the load on the engine is within the predetermined range of load.

4. A control system as claimed in claim 1, wherein when the degree-of-continuation parameter becomes larger than a predetermined switching reference value, said second switching determination means determines that the operation mode should be switched to the all-cylinder operation mode, the control system further comprising:

rotational speed-detecting means for detecting a rotational speed of the engine; and correction means for correcting one of the degree-of-continuation parameter and the switching reference value according to the detected rotational speed of the engine.

5. A control system as claimed in claim 1, wherein the engine is provided with an electric motor for assisting a driving force of the engine.

* * * * *